(12) United States Patent
McGarel et al.

(10) Patent No.: US 6,565,796 B1
(45) Date of Patent: May 20, 2003

(54) METHOD AND APPARATUS FOR USE IN MANUFACTURE OF CELLULOSE CASING

(75) Inventors: Owen Joseph McGarel, Naperville, IL (US); Mickel E. Knight, Greenville, SC (US); Charles Joseph Mackus, Darien, IL (US)

(73) Assignee: Viskase Corporation, Willowbrook, IL (US)

( * ) Notice: Subject to any disclaimer, the term of this patent is extended or adjusted under 35 U.S.C. 154(b) by 0 days.

(21) Appl. No.: 09/971,245

(22) Filed: Oct. 4, 2001

(51) Int. Cl.[7] ............................................... B29C 47/00
(52) U.S. Cl. ...................... 264/559; 264/102; 264/187; 264/203; 264/209.5; 264/211.11; 425/71; 425/380
(58) Field of Search ................................ 264/559, 102, 264/187, 203, 209.5, 211.11, 560, 561, 562, 563, 571; 425/71, 380, 467

(56) References Cited

U.S. PATENT DOCUMENTS

| | | | | |
|---|---|---|---|---|
| 2,179,181 A | | 11/1939 | Graenacher et al. | 106/40 |
| 2,657,431 A | * | 11/1953 | Slaughter | 264/542 |
| 2,987,765 A | * | 6/1961 | Cichelli | 264/565 |
| 3,447,939 A | | 6/1969 | Johnson | 106/135 |
| 4,062,916 A | * | 12/1977 | Skilling | 264/559 |
| 4,145,532 A | | 3/1979 | Franks et al. | 536/56 |
| 4,426,228 A | | 1/1984 | Brandner et al. | 106/200.3 |
| 5,277,857 A | | 1/1994 | Nicholson et al. | 264/187 |
| 5,451,364 A | | 9/1995 | Ducharme, Jr. et al. | 264/559 |
| 5,658,524 A | * | 8/1997 | Portnoy et al. | 264/559 |
| 5,759,478 A | | 6/1998 | Kajiwara et al. | 264/559 |
| 5,766,540 A | | 6/1998 | Kajiwara et al. | 264/559 |
| 5,925,307 A | * | 7/1999 | Kakadjian et al. | 264/560 |
| 5,942,167 A | * | 8/1999 | DuCharme, Jr. | 264/37.2 |
| 6,264,874 B1 | * | 7/2001 | Nielsen | 264/408 |
| 6,444,161 B1 | * | 9/2002 | Williams et al. | 264/559 |

\* cited by examiner

*Primary Examiner*—Mark Eashoo
(74) *Attorney, Agent, or Firm*—Donna Bobrowicz (57) ABSTRACT

Disclosed is a method of sizing nonderivatized extruded cellulosic tubes by the use of a mandrel structure that includes a hollow sizing portion having openings which gather gas bubbles that may evolve at the interface between the extruded tube and the sizing portion and allows the gas to pass into the hollow interior of the mandrel. The mandrel contains a sizing portion larger than the extruded tube, which allows for improved sizing of nonderivatized extruded tubes that are used as casings.

5 Claims, 4 Drawing Sheets

METHOD AND APPARATUS FOR USE IN MANUFACTURE OF CELLULOSE CASING

TECHNICAL FIELD

The present invention relates to a method and apparatus of forming a seamless cellulose tube, suitable for use as a food casing, using a solution of nonderivatized cellulose, tertiary amine N-oxide and water, and to the seamless cellulose tube formed using this method, where such tube, when used as a casing, is easily peelable from the food product cooked within the casing.

BACKGROUND OF THE INVENTION

Cellulose food casings are well known in the art and are widely used in the production of stuffed food products such as sausages and the like. Cellulose food casings used in the manufacture of small diameter sausages such as frankfurters and the like generally are seamless tubes formed of a regenerated cellulose and contain a plasticizer such as water and/or a polyol such as glycerin. Without plasticization, the cellulose tube is too brittle for handling and commercial use.

Cellulose food casings of pure regenerated and non-reinforced cellulose for the manufacture of frankfurters generally have a wall thickness ranging from about 0.025 mm to about 0.076 mm and are made in tube diameters of about 14.5 mm to 203.2 mm. These casings are hereinafter referred to simply as "cellulose casing".

Cellulose casing is most commonly produced by the well known and so called "viscose process", wherein viscose, a soluble cellulose derivative, is extruded as a tubular film. The annular extrusion die extends through the bottom of a coagulating and regenerating bath so that the extrusion proceeds in an upward direction through the bath. By extruding upwardly directly into the regenerating bath, the bath liquid supports the extrusion which is fragile and not self supporting during the initial phase of regeneration. After sufficient regeneration to be self supporting, the tube undergoes additional processing steps and is then washed, plasticized with glycerin or other polyol, and dried. Drying usually is accomplished while the tube is inflated with air at a pressure sufficient both to maintain a constant tube diameter and to orient the film.

Food casings typically contain additives or coatings to enhance food processing and food characteristics, such as colorants that are incorporated into the casing to make self-coloring casings or liquid smokes, which impart a smoky flavor and a reddish color to the sausage.

Casings are used for the production of skinless sausages. Emulsified meat is stuffed into a casing, which is pinched off at intervals to form the sausages. The linked sausages are cooked and smoked, to flavor, denature and coagulate the protein in the outer layer of the sausage, and then cooled to set the coagulated protein. The cooked, smoked sausages are then showered to humidify them fully and relax the skin, which is then stripped off, leaving firm, skinless sausages. It has been found that when the casing is peeled from the cooked sausages, the meat may adhere to the casing during the stripping step and is pulled away, resulting in a commercially unacceptable product. Peeling aids that allow the casing to be completely stripped off the cooked meat product without causing any of the meat product to be damaged are also an important component of commercial casing.

The present invention involves an alternate cellulose production method in which a cellulose solution is formed by means of a simple dissolution rather than requiring the formation of a cellulose derivative prior to forming a soluble substance (as in the viscose process). A cellulose dissolution process is described, for example, in U.S. Pat. No. 2,179,181 ("'181"), where a natural cellulose is dissolved by a tertiary amine N-oxide to produce solutions of relatively low solids content. The cellulose in the resulting solution is "nonderivatized" in that the natural cellulose was not chemically reacted prior to dissolution to produce a soluble cellulose derivative as would occur for example, in the viscose process. U.S. Pat. No. 3,447,939 ("'939") discloses use of N-methyl-morpholine-N-oxide ("NMMO") as the tertiary amine N-oxide solvent where the resulting solutions, while having a low solids content, nevertheless can be used in chemical reactions involving the dissolved compound, or to precipitate the cellulose to form a film or filament.

More recent patents such as U.S. Pat. Nos. 4,145,532 and 4,426,288 improve upon the teachings of the '939 Patent.

U.S. Pat. No. 5,277,857 ("'857") discloses a method and apparatus for manufacturing cellulose food casing from a solution comprising nonderivatized cellulose, NMMO and water.

In '857, nonderivatized cellulose in a molten state, contrary to the viscose process, is extruded as a tubular film downwardly through an air space and into a nonsolvent liquid, such as a water bath. In the water bath, the NMMO solvent is removed to regenerate or precipitate the non-derivatized cellulose, which is then washed of residual solvent, plasticized and dried.

In U.S. Pat. No. 5,451,364 ("'364"), the manufacturing method as disclosed in the prior '857 is improved by the discovery that extruding the thermoplastic cellulose solution through a long air gap improves the properties of the resulting tubular cellulose film. In particular, '364 discloses that the air gap should be over 152.4 mm and preferably from 152.4 mm to 304.88 mm long and perhaps longer.

Both '364 and '857 further disclose the use of a mandrel that depends from the extrusion die and about which the thermoplastic cellulose solution is extruded. This mandrel extends through the air gap and has its lower end face disposed below the level of the nonsolvent liquid bath. The mandrel for most of its length is a slender shaft. The lower portion, however, is larger in diameter and is as large as, or larger than, the extruded tube diameter so it contacts around the entire inner circumference of the extruded tube. The mandrel shaft, being smaller in diameter, is radially spaced from the inner surface of the extruded tube.

The large diameter lower portion of the mandrel serves to size the tube as it enters the bath. Also, since it contacts the extruded tube, the enlarged lower portion of the mandrel together with the extrusion die provide spaced bearing points for stabilizing the extruded tube and preventing it from wandering.

The mandrel also is used to introduce a nonsolvent liquid into the interior of the extruded tube. One function of this introduced nonsolvent liquid, among others, is to lubricate around the circumference of the lower portion of the mandrel to prevent the extruded tube from binding as it passes over the surface of the lower portion or blocking when it later is collapsed to a flat width.

In this regard, a nonsolvent liquid or "inner bath" is introduced inside the extruded tube through ports in the mandrel shaft. This inner bath flows down the mandrel and pools where the extruded tube meets the enlarged lower end of the mandrel. This pooling distributes the nonsolvent around the mandrel so the entire outer circumference of the mandrel lower portion is wetted. Nonsolvent liquid then flows off the mandrel and to the bath within the extruded tube.

U.S. Pat. No. 5,766,540 discloses a mandrel structure allowing extrusion through even longer air gaps of up to 500 mm or more.

U.S. Pat. No. 5,759,478 discloses that certain properties of the cellulose film formed by the tubular extrusion as described in '857 are enhanced by increasing the length of the enlarged lower or "sizing portion" of the mandrel. It is speculated that maintaining the extruded tube in a stretched condition for a longer time by keeping it in contact with the sizing portion of the mandrel allows desirable orientation characteristics of the gel tube to "set" during the solvent extraction process. Whatever the reason, a longer contact time with the sizing portion of the mandrel was desirable and '478 indicates that a preferred length of the sizing portion is about 50 mm.

However, as disclosed in '478, increasing the length of the sizing portion of the mandrel gives rise to another problem. This involves the removal of gas bubbles from the interface between the surface of the sizing portion and the inside surface of the extruded tube that likely are formed by out-gassing of air from the extruded tube. In '478, these bubbles are removed through a series of interconnected circumferential grooves formed in the surface of the sizing portion.

It now has been found that both the stability of the extrusion process and properties of the casing are further improved when the length of the sizing portion is increased to lengths greater than the 50 mm disclosed in '478. Increasing the length of the sizing portion necessitated additional circumferential grooves to provide for the removal of gas bubbles. However, adding more grooves made difficult the drawing of the leading end of the extrusion over the sizing portion on the start-up of extrusion. This is because the increase in the number of grooves increased the likelihood of the leading end of the extrusion snagging on the edge of a groove.

Also, contrary to earlier belief, the additional grooves did not act as air bearings that facilitated the passage of the extrusion over the sizing portion. Instead, each additional groove added an amount of frictional force so that the total drag caused by the extrusion passing over the many circumferential grooves was incompatible with the smooth passage of the extrusion over the mandrel sizing portion. With too many grooves, the frictional force may become so great that the extrusion breaks rather than being pulled over the mandrel. Accordingly, the addition of grooves to provide for gas removal as taught by '478 limited the mandrel length and interfered with the benefits that were seen from the use of a mandrel longer than 50 mm. Thus, while it was found that mandrels of up to 152 mm or more were desirable from the standpoint of the stability of the extrusion process and casing properties, the additional circumferential grooves needed to accommodate gas removal over this length prevented use of the more desirable longer length mandrel.

Accordingly, it is an object of the present invention to provide an improved apparatus and method for extruding a seamless tube of a thermoplastic nonderivatized cellulose solution to permit the use of a mandrel having a longer sizing portion to diametrically expand the extruded tube including means to accommodate and remove gas bubbles that are generated at the interface between the surface of the sizing portion and the inner surface of the extruded tube.

Once produced, by either the viscose process or the nonderivatized process, the various additives and peeling aids can be added to the casing by various methods, such as dipping or spraying the relevant materials onto the formed casing. While it is well known that regenerated casings made with the viscose process are able to accept these additives and coatings and produce casing that peels readily from the cooked meat product, it is not well known how casings made from the nonderivatized process would accept such additives.

Therefore, it is also an object of the present invention to provide an improved method of making a nonderivatized casing that peels readily from cooked sausages.

Additionally, another object of the present invention is to provide the improved nonderivatized casing itself.

SUMMARY OF THE INVENTION

In the present invention, a tube of thermoplastic nonderivatized cellulose is downwardly extruded through a long air gap and into a bath of nonsolvent liquid as is generally disclosed in both '857 and '364.

For purposes of this specification, "nonderivatized" cellulose means a cellulose that has not been subjected to covalent bonding with a solvent or reagent but that has been dissolved by association with a solvent or reagent through van der Waals forces, such as hydrogen bonding. "Nonsolvent" means a liquid that is not a cellulose solvent.

As shown in '857 and '364, extrusion is about a mandrel which depends from the extrusion die. The mandrel has a shaft portion and a tapered lower end portion, wherein all diameters of the lower end portion are larger in diameter than the shaft. The lower end or "sizing portion" of the mandrel has a diameter larger than the extruded diameter of the thermoplastic tube so the tube is stretched as it passes over the sizing portion. In another embodiment, instead of having a tapered lower end portion, the lower end will have at least two constant diameter sections, both larger in diameter than the shaft, connected by at least one diametrically expanding section. As noted above, gas bubbles tend to generate at the interface between the outer surface of the sizing portion and the inside surface of the extruded tube. In the present invention, the sizing portion is hollow for most of its length and openings in the outer surface of the sizing portion provide passages to conduct these bubbles directly from the surface to the hollow interior of the sizing portion. A conduit extending up from the hollow interior and through the shaft portion provides for the removal of gas from the hollow interior of the sizing portion.

Accordingly, the invention may be characterized in one aspect by an apparatus for extruding a seamless tubular film from a thermoplastic solution composed of nonderivatized cellulose, a tertiary amine oxide cellulose solvent, and water by extruding a tube of the solution downwardly from an annular die, through an air space and into an outer bath of a nonsolvent liquid for regenerating the cellulose from the solution, the extrusion being about a mandrel comprising a shaft which depends from the die and extends through the air space and a sizing portion at a lower end of the shaft located adjacent to a conical transition section and that is disposed for all, or the majority of its length, below the level of the liquid in the bath.

The sizing portion is formed by an annular wall that defines a hollow cylinder having a length of from 60 to 152.4 mm or more and an outside diameter greater than the diameter of the tubular extrusion. In one embodiment, the sizing portion is tapered, wherein all diameters of the lower end portion are greater in diameter than the diameter of the tubular extrusion, and where the outside diameter of the lowermost end face of the sizing portion is greater than the diameter of the widest edge of the conical transition section. The outer surface of the sizing portion is smooth and is provided with a plurality of openings that extend through the annular wall to the hollow interior of the cylinder. These openings allow gas bubbles generated at the interface between the outer surface of the sizing portion and the inner surface of the extrusion to pass through the annular wall directly into the hollow interior of the sizing portion. Preferably, the openings are arranged such that any drag created as the extrusion passes over the openings does not create a moment of force tending to turn or twist the extrusion with respect to the sizing portion.

From the interior of the sizing portion, the gas is removed upwardly through a conduit in the stem that opens into the hollow cylinder.

In another aspect, the present invention may be characterized by a method of:

a) forming a seamless cellulose tube by downwardly extruding a tube of thermoplastic solution composed of nonderivatized cellulose, a tertiary amine oxide and water through an air gap and into a nonsolvent bath;

b) during the course of extruding, causing the extrusion to pass over and about a vertically oriented mandrel having a sizing portion generally in the shape of a tapered hollow cylinder, where all diameters of the tapered hollow cylinder are larger than the extruded tube, and a length of 60 to 152.4 mm or more, the mandrel having a smooth surface provided with a plurality of openings to the interior of the hollow cylinder;

c) passing gas bubbles evolving from the extruded tube at the interface between the extruded tube and sizing portion through the openings and into the hollow interior; and d) removing the gas from the hollow interior upwardly through the mandrel.

Another aspect of this invention is a tubular cellulose film made of nonderivatized cellulose precipitated from an extruded thermoplastic cellulose solution of cellulose, a tertiary amine oxide, and water, wherein said tubular film exhibits improved peeling characteristics.

Another aspect of this invention is a tubular extrusion formed of a thermoplastic cellulose solution composed of a nonderivatized cellulose, a tertiary amine oxide cellulose solvent, and water, produced by the process comprising:

a) forming a seamless cellulose tube by downwardly extruding a tube of thermoplastic solution composed of nonderivatized cellulose, a tertiary amine oxide, and water through an air gap and into a nonsolvent bath;

b) during the course of extruding, causing the extrusion to pass over and about a vertically oriented mandrel having a sizing portion generally in the shape of a hollow cylinder that has a diameter larger than the extruded tube and having a diameter at the point the sizing portion is adjacent to a conical transition cylinder being the same as the adjacent edge of the conical transition cylinder and a diameter of a lowermost end face being greater than the diameter of the widest edge of the conical transition section, the mandrel having a lower end disposed below the level of the bath and a smooth outer surface provided with a plurality of openings to the interior of the hollow cylinder;

c) passing gas bubbles evolving from the extruded tube at the interface between the extruded tube and sizing portion through the openings and into the hollow interior; and d) removing the gas from the hollow interior upwardly through the mandrel.

Other objects and advantages of this invention will be apparent from the ensuing detailed disclosure and appended claims.

DETAILED DESCRIPTION OF THE INVENTION

Figure 1:
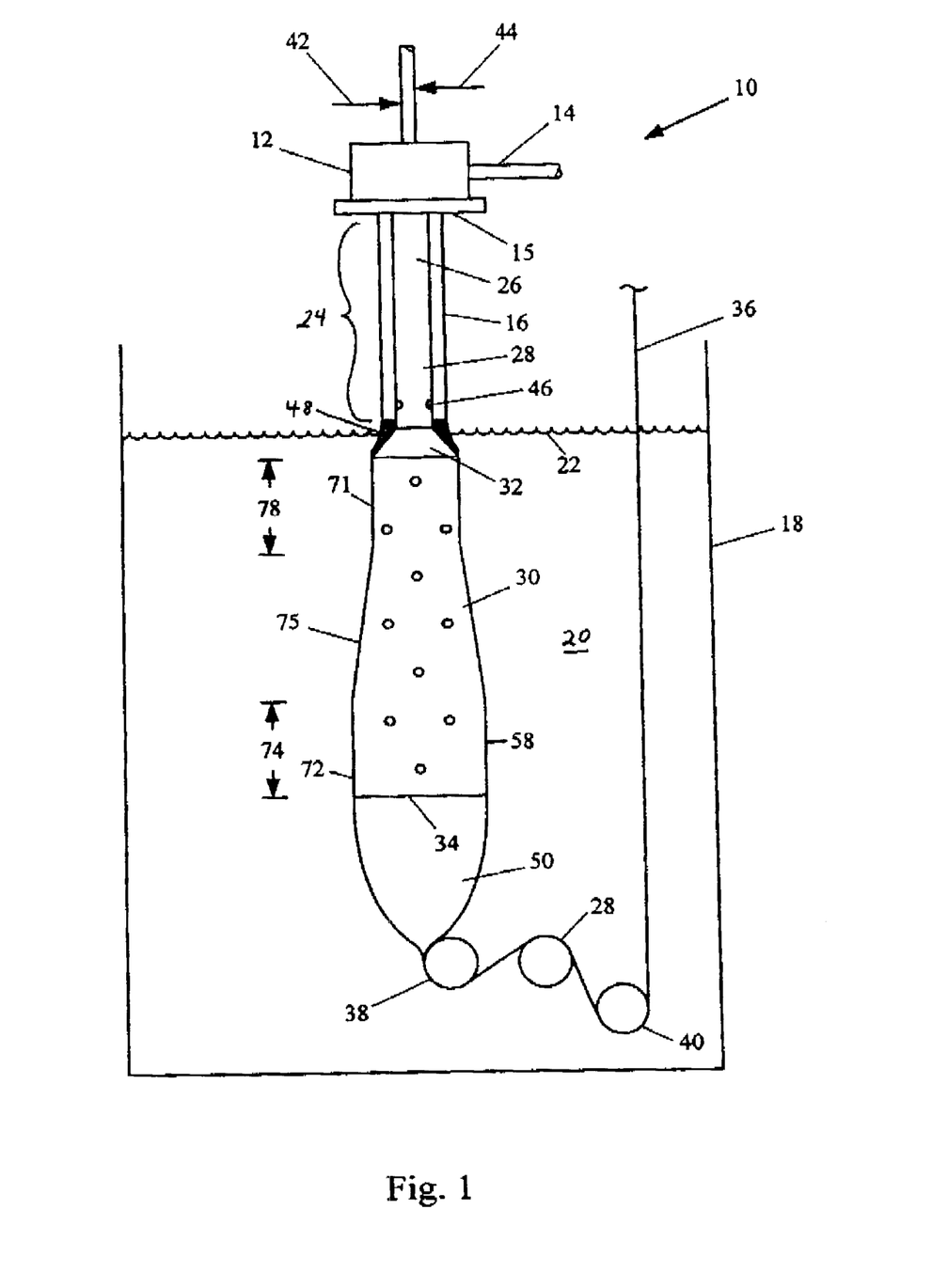
FIG. 1 is a schematic view showing the apparatus of the present invention during the course of steady-state extrusion.

Referring to the drawings, FIG. 1 shows the apparatus generally indicated at 10 during the course of steady-state operation. The apparatus includes a die 12 arranged to downwardly extrude a thermoplastic cellulose solution. The die inlet 14 receives the molten solution under pressure from any appropriate source (not shown). The solution is a solution of a natural cellulose (such as wood pulp) dissolved in a cellulose solvent comprising NMMO and water. Methods of making an appropriate solution ("dope") for extrusion as a tubular film are well known in the art and comprise no part of the present invention.

The die has an annular extrusion orifice 15 so the molten dope is extruded as a seamless tube indicated at 16. For purposes of extruding a small diameter food casing, the extrusion orifice is about 12–16 mm in diameter. As shown in FIG. 1, the die is arranged above a vessel 18 which contains a bath 20 (some times referred to as an "outer bath") comprising nonsolvent liquid. Water or an aqueous solution containing a low concentration of NMMO are preferred nonsolvents for purposes of the present invention. The die is spaced well above the level 22 of the bath so the tube is extruded downwardly through a long air gap 24. This air gap may be 304 mm to 500 mm or more in length.

Depending from the die is a mandrel, generally indicated at 26, which extends from the die to below the bath level 22. A preferred mandrel structure is more particularly disclosed in U.S. Pat. No. 5,766,540. In general, the mandrel has a shaft portion 28 and a lower portion 30. The lower portion preferably is larger in diameter than the diameter of the annular extrusion orifice 15. Thus, the lower portion 30 comprises a means for diametrically stretching or "sizing" the extruded tube and is referred to hereafter as the mandrel sizing portion. The mandrel sizing portion 30, and a conical transition section 32, preferably are made of a hydrophobic material such as Teflon or a filled Teflon.

As the extruded tube 16 enters bath 20, the NMMO solvent is drawn from the tube causing regeneration of the dissolved cellulose to form a so called "gel tube" 36 of pure cellulose. This gel tube is collapsed to a flat width by a series of fingers or baffles 38 and then is drawn around a driven roll 40 and directed up and out of the vessel 18 for further processing.

The tubular extrusion process, as disclosed in '857 and '364, further includes the introduction of air and a nonsolvent liquid into the interior of the extruded tube 16. Both air and the nonsolvent, hereafter called "the inner bath", are introduced through the mandrel. In this respect, an air line 42 connected to the upper end of mandrel shaft 28 provides an air flow through the mandrel to openings (not shown) in the shaft that vent the air into the interior of the extruded tube to hold it open at the start of the extrusion process. Nonsolvent liquid for the inner bath likewise is introduced into the mandrel through a line 44 that is connected to one or more ports 46 in the mandrel shaft 28. After the nonsolvent exits the mandrel, it flows down the surface of the mandrel shaft 28 and flows down the mandrel shaft to form a pool 48. This pool provides lubrication to permit the passage of the extruded tube over the mandrel sizing portion 30 and starts the regeneration of the cellulose at the inner surface of the extruded tube. The inner bath from the pool passes down between the mandrel sizing portion and the extruded tube and flows into the volume 50 of bath liquid within the tube.

Figure 2:
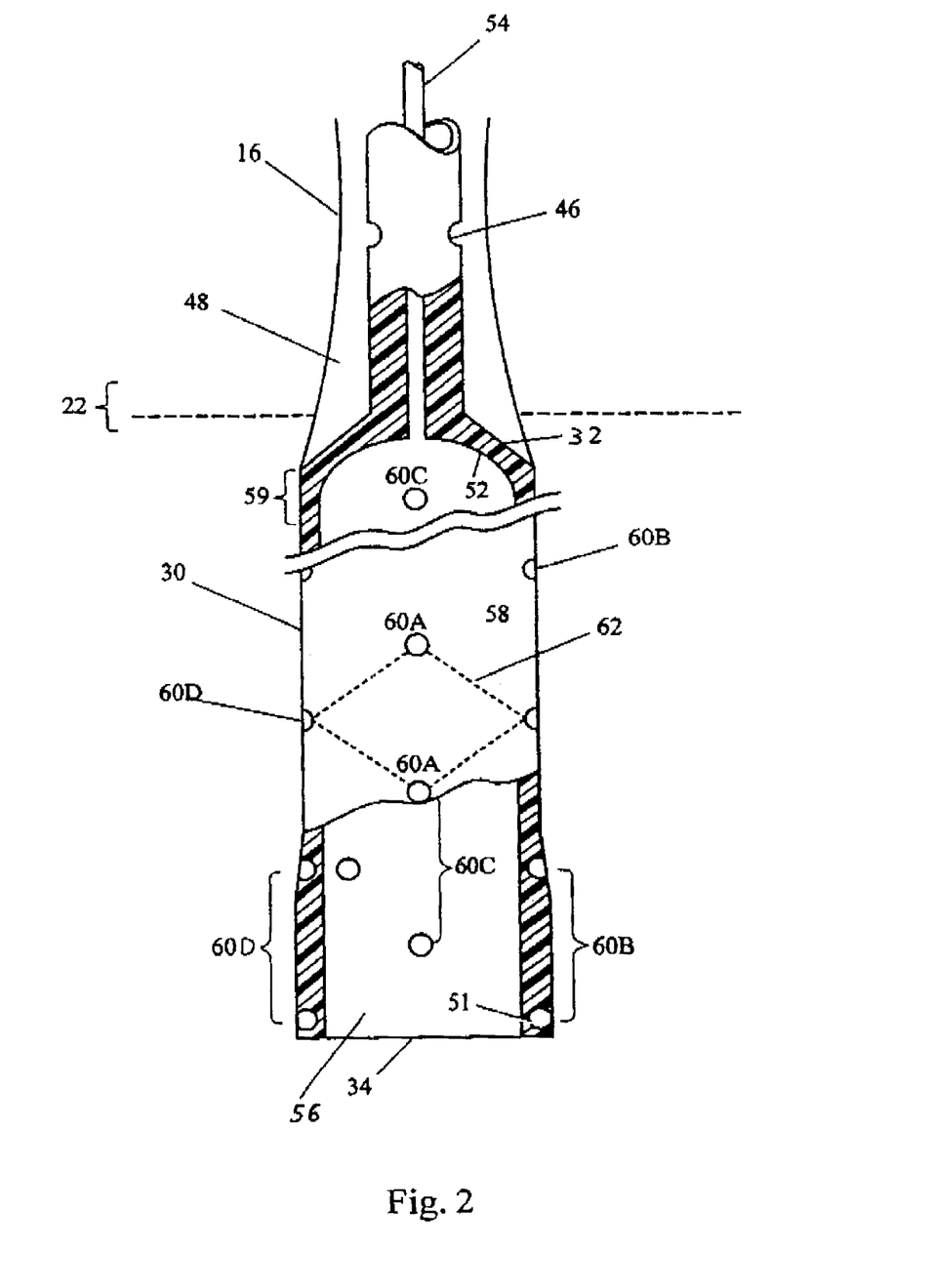
FIG. 2 is a view on an enlarged scale, partly broken away and in section showing the sizing portion of the mandrel in greater detail.

As best seen in FIG. 2, the mandrel sizing portion 30 is formed by an annular wall 51 that defines a hollow cylinder between the conical transition section 32 and the lowermost end face 34. In one preferred embodiment, as seen in FIG. 1, the mandrel sizing portion consists of at least two constant diameter sections 71 and 72 of lengths 78 and 74 respectively, connected by a diametrically expanding section 75. Constant diameter section 71 begins at the-lower edge of the conical transition section 32 and is smaller in diameter than the lowermost end face 34. In FIG. 2, the lowermost end lace 34 of the sizing portion is open and the upper end 52 is slightly dome-shaped. An exhaust conduit 54 extending through the mandrel stem 28 opens into the hollow interior 56 adjacent the upper end 52 of the sizing portion. The outer surface 58 of the cylinder is smooth and unbroken except for a plurality of openings 60 that extend through the annular wall 51 and communicate with the hollow interior 56.

Figure 3:
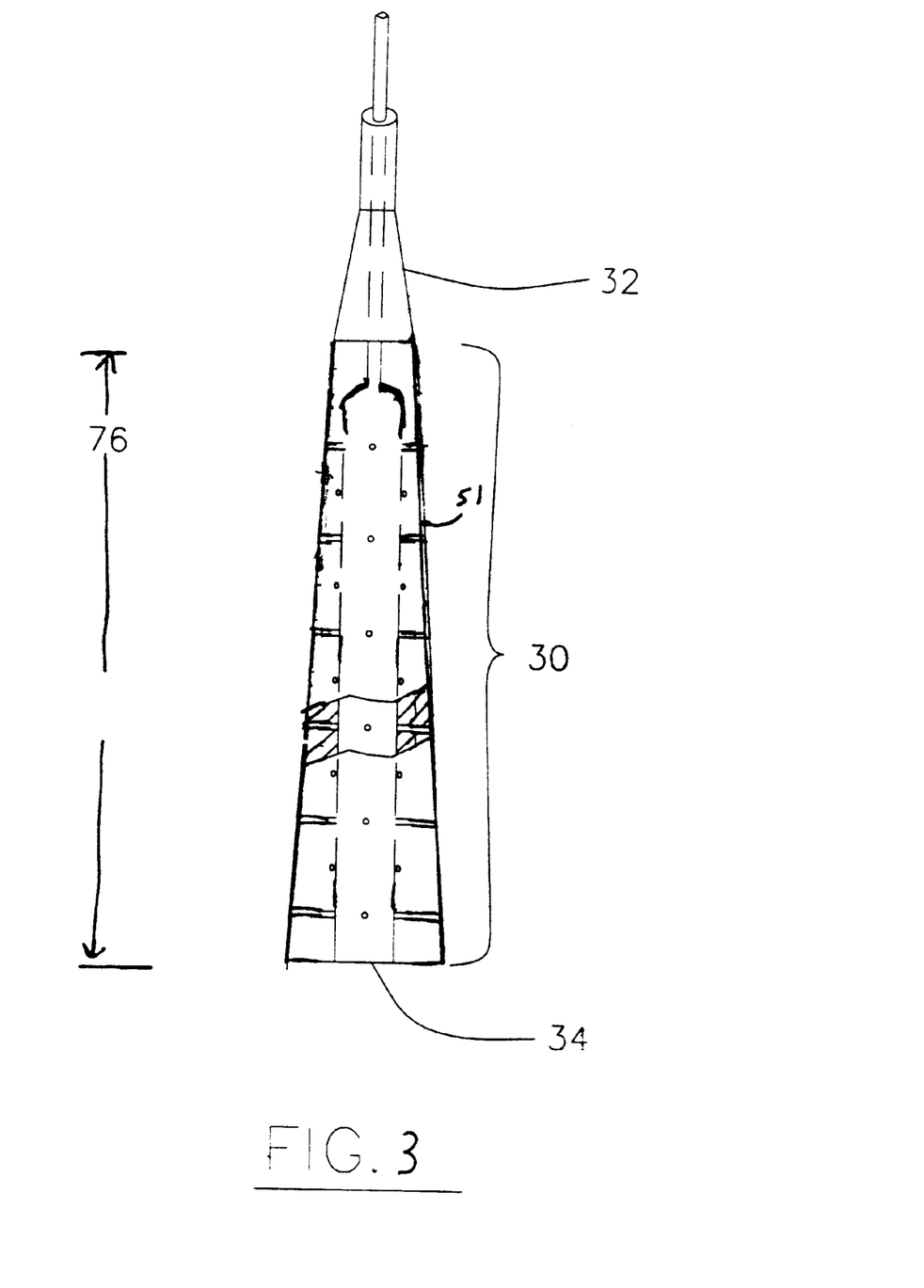
FIG. 3 is a view of another embodiment of the tapered mandrel.

In another preferred embodiment, as shown in FIG. 3, the mandrel sizing portion 30 consists of an annular wall 51 between the lower edge of conical transition section 32 and the lowermost end face 34, with the diameter of annular wall 51 being continuously tapered over its length 76, and where annular wall 51 defines a hollow cylinder including the conical transition section 32 and the lowermost end face 34. All diameters of this mandrel sizing portion 30 are greater in diameter than the shaft and the diameter of the lowermost end face 34 is greater than the diameter of the lower edge of the conical transition section 32.

In one embodiment, the openings 60 are arranged in four rows (A, B, C and D) extending substantially the full length of the sizing portion wherein each of the two diametrically opposite rows of openings 60A and 60C are spaced at 90° around the circumference of the sizing portion from the two diametrically opposite rows of openings 60B and 60D. Moreover, as shown in FIG. 2, the openings of diametrically opposite rows A and C are longitudinally off set from the openings of the diametrically opposite rows B and D so that each of the holes 60A and 60C are about midway between the openings 60B and 60D. This arranges the openings in a diamond shape pattern 62, represented by dotted line 62, about the surface of the mandrel. It is believed that the placement of the openings at 90° intervals around the circumference of the sizing portion and the longitudinal off set of the openings prevent the drag created by the holes from imparting any rotary motion to the extruded tube around the sizing portion. This insures that the extrusion is solely in a linear direction with no angular motion that could adversely affect the properties of the casing that is produced.

When extrusion is through a long air gap of 300 mm and up to 500 mm or more, it is preferred that the mandrel be an extendable mandrel as disclosed in U.S. Pat. No. 5,766,540. With an extendable mandrel, extrusion is started with the mandrel in a raised position such that the lowermost end face 34 is above the liquid level 22.

Extrusion is started and the leading end of the extruded tube 16 is drawn down and over the sizing portion 30. Once the leading end of the extruded tube is beyond the mandrel lower end face 34, the mandrel is extended to the position shown in FIG. 1 wherein most, if not all, of the mandrel sizing portion 30 is disposed below the liquid level 22. The inner bath introduced through ports 46 collects in a pool 48 which forms around the lower end of the mandrel stem. Nonsolvent liquid from this pool is carried out from between the inner surface of the extruded tube and the cylinder surface 58 to lubricate this area and permit the passage of the extruded tube over the sizing portion.

During the course of extrusion, gas bubbles may appear at the interface between the extruded tube 36 and the mandrel sizing portion 30. It is not known with certainty why these gas bubbles form. It is speculated that the gas is air which becomes dissolved in the molten thermoplastic solution during the formation and extrusion of the solution. This so called "soluble air" remains in solution so long as the molten thermoplastic solution is under pressure. However, once the solution is extruded, this soluble air is released as an out gas from the extruded tube.

In any event, a portion of gas released from the inner surface of the tube becomes trapped between the inner surface of the extruded tube and the surface of the mandrel sizing portion. The openings 60 shown in FIG. 2 provide the means for allowing the gas bubbles to pass through the annular wall 51 and into the hollow cylinder. In this respect, the hollow interior of the cylinder is under a slight negative pressure created by evacuation through conduit 54. This draws the gas bubbles through the openings 60 and into the hollow interior of the mandrel sizing portion 30. The gas bubbles then rise and collect within the mandrel adjacent the domed upper end 52. From there, the gas is removed upwardly through the conduit 54 in the mandrel stem.

Also, it is preferred that there be an unbroken band 59 about the sizing portion between the conical section 52 and the uppermost hole 60. This band, together with the negative pressure within the hollow cylinder tends to create a seal that prevents gas bubble from migrating upwardly along the surface of the mandrel sizing portion 30 and into the volume of the extruded tube above the sizing portion.

Occasionally however, a gas bubble may move upward into the volume within the extruded tube above the sizing portion. If need be, the air introduced into this volume can be adjusted to correct for pressure variations that may be caused by the accumulation of gas in this space.

In accordance with the present invention, providing the mandrel sizing portion 30 with the openings 60 allows for the gathering of gas bubbles into the hollow interior of the sizing portion. This gathering of gas bubbles removes them to a location where they will not disrupt the formation of the gel tube. Further, it is preferred that the extrusion process be as linear as possible and that there be no moment of force tending to impart a twist of the extrusion about the mandrel sizing portion. Accordingly, the arrangement of the openings 60 along the smooth cylinder surface 58 as shown is such that the drag created as the extrusion passes over these opening does not impart such a moment.

Figure 4:
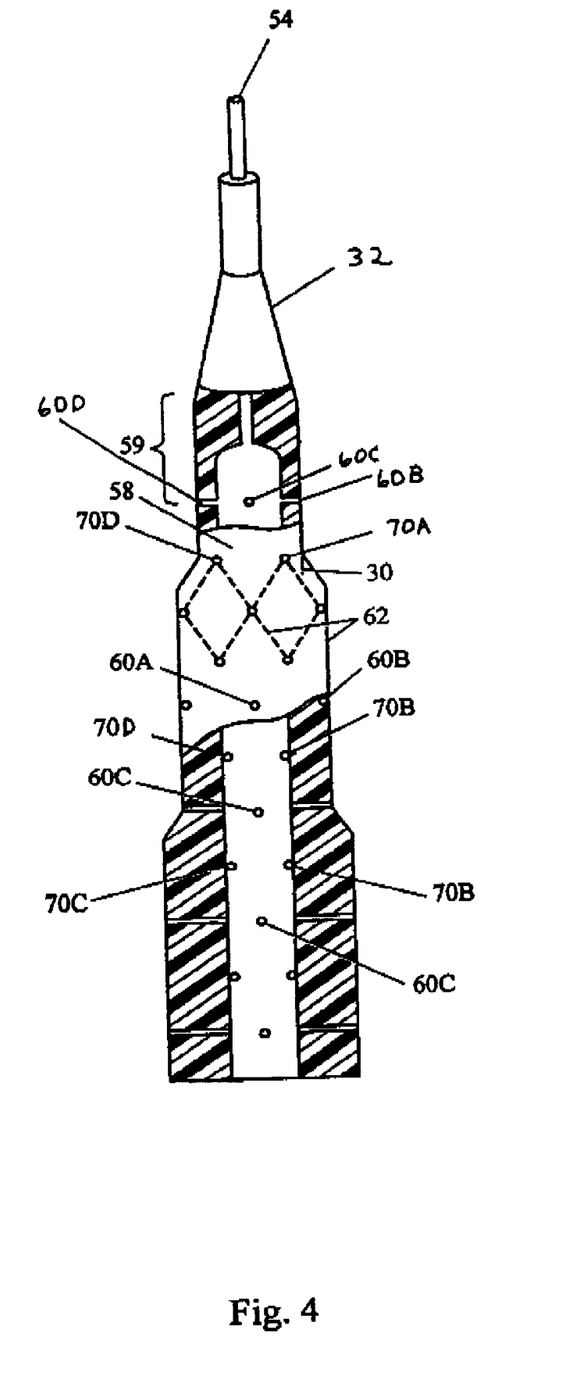
FIG. 4 is a view similar to FIG. 2 showing another embodiment of the inventive mandrel.

Another embodiment is illustrated in FIG. 4. As shown in FIG. 4, the mandrel sizing portion 30 has a plurality of openings 60 arranged so as to form a diamond shape on the mandrel surface 58. However, instead of four longitudinal rows of openings as in the FIG. 2 embodiment, there are eight rows shown in FIG. 4. The openings 60 in four of the rows A, B, C and D are equally spaced at 90° intervals around the mandrel and are equally spaced in the rows along the mandrel. A second set of openings 70 are arranged in four rows that are off set both radially and longitudinally from the openings 60 so as to produce the diamond shape patterns on the mandrel surface represented by dotted lines 62. In this respect, the openings 70 arranged in the four rows A, B, C and D are radially off set 45° from the openings 60. The openings 70 also are longitudinally off set so that each of the openings 70 A, B, C and D are located about half way between the openings 60 A, B, C and D.

Having one set of the four rows of openings 60 off set 45° from the four rows of openings 70 as shown in FIG. 4 minimizes the distance between openings. With this arrangement, gas bubbles have a shorter time to grow in size before being drawn into one of the openings.

In the case of a mandrel having a mandrel sizing portion 30 about 23 mm in diameter at the junction of the conical transition section 32 and a diameter of 28 mm at the lowermost end face 34, and 152.4 mm in length, a suitable arrangement as shown in FIG. 4 provided forty-four openings arranged in four rows of six openings each and four rows of five openings each. The unbroken band 59 just below the conical section 32 was about 12.5 mm wide. The openings in each of the four rows are longitudinally spaced about 25 mm apart. Each opening is less than about 3.2 mm in diameter and preferably is about 0.8 to 1.6 mm in diameter. Holes larger than about 3.2 mm were found to create a drag on the extrusion making start-up difficult. Openings smaller than about 0.8 mm in diameter were not as effective in passing the gas bubbles.

Thus it should be appreciated that the present invention allows use of a mandrel sizing portion of up to 150 mm or more in length and accommodates the removal of gas bubbles from the surface of the sizing portion without the drawbacks of having a grooved surface to accommodate such removal.

Additionally, the present invention includes the tubular extrusion, which is a film or a casing, formed of a thermoplastic cellulose solution composed of a nonderivatized cellulose, a tertiary amine oxide cellulose solvent, and water, produced by the process comprising:

a) forming a seamless cellulose tube by downwardly extruding a tube of thermoplastic solution composed of nonderivatized cellulose, a tertiary amine oxide, and water through an air gap and into a nonsolvent bath;

b) during the course of extruding, causing the extrusion to pass over and about a vertically oriented mandrel having a sizing portion generally in the shape of a hollow cylinder that has a diameter larger than the extruded tube and having a diameter at the point the sizing portion is adjacent to a conical transition cylinder being the same as the adjacent edge of the conical transition cylinder and a diameter of the lowermost end face of the sizing portion being greater than the diameter of the widest edge of the conical transition section, the mandrel having a lower end disposed below the level of the bath and a smooth outer surface provided with a plurality of openings to the interior of the hollow cylinder;

c) passing gas bubbles evolving from the extruded tube at the interface between the extruded tube and sizing portion through the openings and into the hollow interior; and d) removing the gas from the hollow interior upwardly through the mandrel.

The sizing portion of the mandrel can be shaped as described previously, either as continuously tapered as seen in FIG. 3, or with a plurality of constant diameter sections connected by continuously expanding sections, one embodiment thereof as seen in FIG. 1.

In order to be commercially viable, tubular film used as casing for the manufacture of sausages or other stuffed meat products must have the characteristic of being easily peeled from the cooked sausage or meat product. A test method used to determine this characteristic is called the "stretch burst" test. A section of casing is soaked in room temperature water for thirty minutes to insure it is in a rewet condition. Once soaked, one end of the sample is tied off and the sample is inflated with air at a rate of pressure increase of about 44.52 mm Hg/sec, until it bursts. The diameter increase during inflation and the diameter at burst are recorded.

Casing wall thickness is roughly constant over a large range of cellulose casing sizes. However, as casing size increases, the slope of the stretch burst (SB) curve increases. The change in slope is primarily due to the hoop stress.

Cellulose casing is a thin-walled cylindrical pressure vessel. When pressurized, in-plane casing stress is proportional to the cylinder radius. In-plane stress in the axial direction is given by Equation 1. In-plane stress perpendicular to the cylinder axis (i.e., around the circumference of the casing) is given by Equation 2. The value given by Equation 2 is also referred to as hoop stress. In Equations 1 and 2, p is pressure, t is casing wall thickness, and r is casing radius.

$$\sigma_1 = \frac{pr}{2t}$$

Equation 1: In-plane casing stress in the axial direction.

$$\sigma_2 = \frac{pr}{t}$$

Equation 2: Hoop stress in a cylindrical pressure vessel.

The effect of hoop stress can be seen in Table 1. Table 1 shows the effect of rewet flat width ("RFW") on the ratio of RFW and 150 mm Hg diameter for a variety of Nucel casing sizes. The ratio of RFW and 150 mm Hg diameter is a measure of casing SB slope. Table 1 also contains wall thickness values expressed as the ratio of RFW divided by casing bone dry gauge (BDG). Even though wall thickness (t) varies only slightly over the range of casing sizes shown in Table 1, the casing slope steadily increases over the range of casing sizes shown in Table 1.

TABLE 2

Effect of casing size on SB slope.

Casings made by the viscose process, known as 25N NoJax® (a registered trademark of Viskase Corporation, Chicago, Ill., USA) have been tested with the stretch burst test, showing that commercially acceptable casing, with a RFW averaging 35.47 mm, has an average burst pressure of 271.33 mm Hg, with the average diameter at burst being 37.33 mm.

Nonderivatized casing made using a mandrel having a constant diameter in the sizing portion, and therefore not a mandrel of the instant invention, was tested using this stretch burst test. (The diameter of the casing at 50 mm Hg is denoted as D50, and the diameter converted to flat width at the 150 mm Hg pressure point is denoted as F150.) This nonderivatized casing followed the regression:

$$F150/RFW = (0.297 \times D50) + 0.980$$

In order to give the best commercial peeling characteristics, the optimum value of the F150/RFW point is a value of one. The 25N NoJax® casing described above, a commercial casing, has a F150/RFW of 1.10. As shown in the Examples below, it has been discovered that the inventive nonderivatized casing produces a F150/RFW point closer to a value of one than do nonderivatized casings not of the present invention.

EXAMPLES 1–6

Burst Strength of Nonderivatized Casing

Nonderivatized cellulose casing made using a mandrel having a first constant diameter section of 0.92 inches and a second constant diameter section of 1.10 inches was tested using the stretch burst test as described above. The results are shown in Table 2 for Examples 2, 4, and 6. Nonderivatized cellulose casing of the same size as the casings shown in Examples 2, 4, and 6 were made using a straight mandrel and subjected to the same stretch burst test. Those results are shown in Examples 1, 3, and 5

The casings of Examples 2, 4, and 6 had a F150/RFW point that was less than that given by the casings of Examples 1, 3, and 5 by at least 0.02 inches, and therefore showed improved peelability.

TABLE 2

Comparison of Casings Made with Straight and Tapered Mandrels

| Ex. No. | Casing | RFW | D150 | F150 | F150/RFW | D50 |
|---|---|---|---|---|---|---|
| 1. | Size 26[a] | 1.251 | 0.965 | 1.516 | 1.212 | 0.783 |
| 2. | Size 26[b] | 1.254 | 0.950 | 1.492 | 1.190 | 0.786 |
| 3. | Size 23[a] | 1.150 | 0.870 | 1.367 | 1.188 | 0.700 |
| 4. | Size 23[b] | 1.170 | 0.870 | 1.367 | 1.168 | 0.700 |
| 5. | Size 27[a] | 1.340 | 1.051 | 1.651 | 1.232 | 0.848 |
| 6. | Size 27[b] | 1.318 | 0.986 | 1.549 | 1.175 | 0.815 |

[a] = Casing sample made with a straight mandrel.
[b] = Casing sample made with a tapered mandrel.

Having described the invention in detail, what is claimed as new is:

1. A method of diametrically sizing a tubular extrusion composed of a thermoplastic cellulose solution comprising:

a) forming a seamless cellulose tube by downwardly extruding a tube of thermoplastic solution composed of nonderivatized cellulose, a tertiary amino oxide, and water through an air gap and into a nonsolvent bath;

b) during the course of extruding, causing the extrusion to pass over and about a vertically oriented mandrel having a sizing portion generally in the shape of a hollow cylinder that has a diameter larger than the extruded tube and having a diameter at the point the sizing portion is adjacent to a conical transition cylinder being the same as the adjacent edge of the conical transition cylinder and a diameter of a lowermost end face being greater than the diameter of the widest edge of the conical transition cylinder, the mandrel having a lower end disposed below the level of the bath and a smooth outer surface provided with a plurality of openings to the interior of the hollow cylinder;

c) passing gas bubbles evolving from the extruded tube at the interface between the extruded tube and sizing portion through the openings and into the hollow interior; and d) removing the gas from the hollow interior upwardly through the mandrel.

2. A method as in claim 1 wherein said mandrel has a length greater than 150 mm and each of said openings are between 0.8 to 3.2 mm in diameter.

3. A method as in claim 1 comprising arranging said openings in a diamond pattern about the surface of the sizing portion such that passing the extruded tube along the sizing portion is free of a torsional moment about the mandrel resulting from the drag can the extruded tube caused by the passage of the tube across the openings.

4. A method as in claim 1, wherein said sizing portion is continuously tapered.

5. A method as in claim 1, wherein said sizing portion comprises at least two constant diameter sections connected by at least one diametrically expanding section.

* * * * *